Patented Sept. 24, 1935

2,015,225

UNITED STATES PATENT OFFICE 2,015,225

AZO-DYESTUFFS

Herbert Kracker and Richard Schmid, Frankfort-on-the-Main-Hochst, Germany, assignors to General Aniline Works, Inc., New York, N. Y., a corporation of Delaware No Drawing. Application November 26, 1934, Serial No. 754,911. In Germany December 1, 1933

4 Claims. (Cl. 260—87)

The present invention relates to azo-dyestuffs, more particularly it relates to dyestuffs of the following general formula:

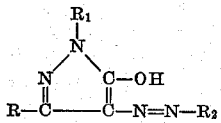

wherein R and $R_1$ stand for radicals of the benzene or naphthalene series, at least one of which contains at least one substituent of the group consisting of sulfonic acid and carboxylic acid groups, and wherein $R_2$ represents a radical of the benzene, naphthalene or diphenyl series.

We have found that azo-dyestuffs of very good fastness properties are obtainable by combining diazotized bases with pyrazolones of the following constitution:

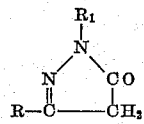

wherein R and $R_1$ stand for aryl radicals, at least one of which contains one or more groups lending solubility in water such as, for instance, the sulfonic acid or carboxylic acid group.

The new dyestuffs dye wool from an acid bath yellow to red tints of very good fastness properties. In comparison with the analogous pyrazolone-azo-dyestuffs, which are substituted in 3-position of the pyrazolone nucleus by a methyl, carboxylic acid or carboxylic acid ester group, the dyestuffs of the present invention are distinguished by an enhanced fastness to washing and to fulling. When compared with the azo-dyestuffs from 1,3-diphenyl-5-pyrazolone, described in "Berichte der Deutschen Chemischen Gesellschaft", vol. 35 (1902), pages 928-929, and in German Patent No. 253,287, the new dyestuffs possess a better fastness to washing and to light.

By using dyestuff-components which contain groups capable of being chromed, such as, for instance, a hydroxyl, carboxyl or arylsulfamino group standing in ortho-position to the diazo group of the base applied, or the grouping of a carboxyl or arylsulfamino group standing in ortho-position to a hydroxyl group, dyeings on wool are obtained which, after being treated with agents yielding chromium, are distinguished by properties of fastness which surpass those of the unchromed dyestuffs.

The pyrazolones used for the preparation of the dyestuffs may be obtained by the process disclosed in our copending application Serial No. 713,616, filed March 1, 1934, for "Sulfonic acid and carboxylic acid derivatives of 1,3-diaryl-5-pyrazolones". The process disclosed therein consists briefly in condensing in an aqueous medium aroyl acetic esters of the formula:

with aromatic hydrazines of the formula:

wherein R and $R_1$ have the same meaning as in the above formula for the pyrazolones and wherein $R''$ stands for an alkyl radical, to form hydrazones and then closing the pyrazolone ring in water.

The following examples serve to illustrate the invention, but they are not intended to limit it thereto; the parts are by weight:

(1) 26.2 parts of 1-amino-4-methylbenzene-3-sulfanilide are stirred with 300 parts of water of 50° C. to 55° C. and dissolved by means of 20 parts of raw hydrochloric acid so that a clear solution is obtained. This solution is diazotized by pouring it into 10 parts of hydrochloric acid and ice-water; 6.9 parts of sodium nitrite are simultaneously run in in the form of a 2-N. solution so that with the aid of potassium iodide starch paper free nitrous acid is always detectable. The diazotization is performed at a temperature of 0° C. to 5° C. Finally a clear diazo-solution is obtained which at a temperature of 0° C. to 5° C. is run into a solution of 33 parts of 1-(4'-sulfophenyl)-3-phenyl-5-pyrazolone rendered alkaline to Brilliant yellow. The dyestuff which has separated is at first slimy; after stirring for about 2 hours it becomes entirely crystalline. The dyestuff is filtered by suction and dried and dyes wool from an acid bath orange-yellow tints of good fastness to washing and to light. It has the following formula:

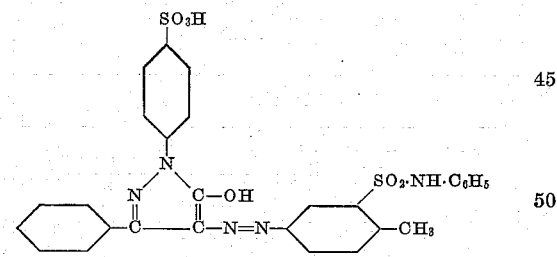

(2) 9.3 parts of aniline are dissolved in 300 parts of water and 25 parts of hydrochloric acid of 20° Bé. and, at 3° C. to 5° C. diazotized in the usual manner with 6.9 parts of sodium nitrite in the form of a 2-N. solution. The clear diazo solution is introduced at 3° C. to 5° C. into a solution of 33 parts of 1-(2'-sulfophenyl)-3-phenyl-5-pyrazolone which is rendered alkaline by means of sodium carbonate. The dyestuff which has separated is filtered by suction and dried. It dyes wool from an acid bath yellow tints of good fastness properties.

(3) 17.3 parts of sulfanilic acid are stirred with 300 parts of water and 25 parts of hydrochloric acid of 20° Bé. and the whole is diazotized at 12° C. to 15° C. with 6.9 parts of sodium nitrite in the form of a 2-N. solution. The diazo solution is run at 10° C. into a solution of 40 parts of 1-(2'-chloro-4'-sulfophenyl)-3-(4''-carboxyphenyl)-5-pyrazolone which has been rendered alkaline by means of sodium carbonate. The dyestuff is salted out by addition of sodium chloride, filtered by suction and dried. It dyes wool reddish-yellow tints of good fastness properties. It has the following formula:

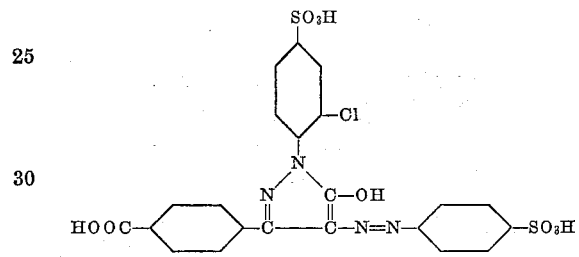

(4) 13.7 parts of anthranilic acid are dissolved in 500 parts of water and 30 parts of hydrochloric acid of 20° Bé. to form a clear solution; the whole is diazotized at 5° to 8° C. with 6.9 parts of sodium nitrite in the form of a 2-N. solution. The clear diazo solution is introduced at 5° C. into a solution of 39 parts of 1-(2-'hydroxy-3'-carboxy-5'-sulfophenyl)-3-phenyl-5-pyrazolone which has been rendered alkaline by means of sodium carbonate. The dyestuff is salted out, filtered by suction and dried. It dyes wool yellow tints; by after-chroming the dyeing on the fiber, a yellow tint of very good fastness to washing, to fulling and to light is obtained.

(5) 25 parts of the solid diazo compound from 1-amino-2-naphthol-4-sulfonic acid are stirred with 100 parts of water and run at 20° C. into a solution of 33 parts of 1-(2'-sulfophenyl)-3-phenyl-5-pyrazolone which has been rendered alkaline by means of sodium carbonate. The completely dissolved dyestuff is precipitated by acidification, filtered and dried. It dyes wool from an acid bath red tints which when after-chromed are distinguished by a very good fastness to fulling, to washing and to light.

(6) 17.3 parts of ortho-aniline-sulfonic acid are dissolved in 300 parts of water and 25 parts of hydrochloric acid of 20° Bé. and the solution obtained is diazotized with 6.9 parts of sodium nitrite in the form of a 2-N. solution. The diazo solution is introduced at 0° C. into a neutral solution of 53 parts of 1-(2'-diphenyl-sulfone-5'-sulfo-4''-hydroxy-3''-carboxyl)-3-phenyl-5-pyrazolone. The solution is rendered acid and sodium chloride is added thereto, the precipitated dyestuff is filtered and dried. It dyes wool from an acid bath yellow tints which when after-chromed are distinguished by very good fastness to washing, to fulling and to light. It has the following formula:

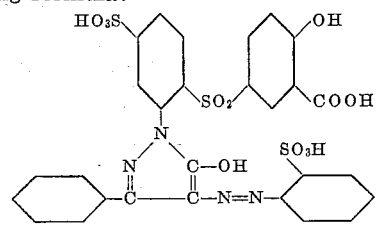

(7) 22.4 parts of 4-chloro-2-aminophenol-6-sulfonic acid are diazotized in the usual manner with 30 parts of hydrochloric acid of 20° Bé. and 6.9 parts of sodium nitrite; the diazo solution is run into a solution of 33 parts of 1-(4'-sulfophenyl)-3-phenyl-5-pyrazolone which has been rendered alkaline by means of sodium carbonate. The thus formed dyestuff is salted out, filtered and dried. By dyeing wool from an acid bath and after-chroming, a clear red dyeing of very good fastness to washing, to fulling and to light is obtained.

(8) A diazo solution is prepared from 14.4 parts of 4-chloro-2-aminophenol, 30 parts of hydrochloric acid of 20° Bé. and 6.9 parts of sodium nitrite. This solution is run into a solution of 39 parts of 1-(4'-hydroxy-3'-carboxy-5'-sulfophenyl)-3-phenyl-5-pyrazolone which has been rendered alkaline by means of sodium carbonate. When the coupling is finished the mixture is acidified and the dyestuff formed is salted out. The dried dyestuff dyes wool, when after-chromed, a red tint of fastness properties similar to those of the dyestuff described in the foregoing examples. It has the following formula:

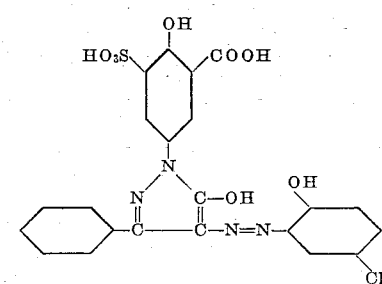

By using other diazotizing or coupling components there may be obtained, in a similar manner, dyestuffs the dyeings of which possess likewise good fastness properties. The following table indicates a number of further dyestuffs which are obtainable according to the present invention:

| | Diazotizing component | Coupling component | Tint on wool |
|---|---|---|---|
| 1 | 1-amino-4-methylbenzene-2-sulfonic acid | 1-phenyl-3-(4'-carboxy-phenyl)-5-pyrazolone | Yellow. |
| 2 | Para-aminobenzoic acid | 1-(2'-sulfo-1'-naphthyl)-3-phenyl-5-pyrazolone | Reddish-yellow. |
| 3 | Meta-aminobenzene-sulfanilide | 1-(2'-chloro-5'-sulfo-phenyl)-3-phenyl-5-pyrazolone | Orange-yellow. |
| 4 | 2-naphthylamine-1-sulfonic acid | 1-(3'-sulfophenyl)-3-phenyl-5-pyrazolone | Do. |
| 5 | Ortho-tolidine | 1-(2'-sulfophenyl)-3-phenyl-5-pyrazolone | Red. |
| 6 | Ortho-chloroaniline | 1-(2'-chloro-4'-sulfophenyl)-3-(4''-carboxy-phenyl)-5-pyrazolone | Reddish-yellow. |
| 7 | Aniline | 1-(4'-sulfophenyl)-3-(4''-carboxyphenyl)-5-pyrazolone | Yellow. |
| 8 | Sulfanilic acid | 1-(2'-methyl-4'-sulfophenyl)-3-phenyl-5-pyrazolone | Do. |
| 9 | Aniline | 1-(2',5'-dichloro-4'-sulfophenyl)-3-phenyl-5-pyrazolene | Do. |
| 10 | 4.4'-diaminotriphenyl-methane | 1-(4'-sulfophenyl)-3-phenyl-5-pyrazolone | Do. |
| 11 | Aniline | 1-(2'-nitro-4'-sulfophenyl)-3-phenyl-5-pyrazolone | Do. |

| | Diazotizing component | Coupling component | Tint on wool |
|---|---|---|---|
| 12 | Mixture of 1-naphthylamine-6-sulfonic acid and 1-naphthylamine-7-sulfonic acid. | 1-(4'-sulfophenyl)-3-phenyl-5-pyrazolone | Brown. |
| 13 | Ortho-toluidine | 1-(4'-nitro-2'-sulfophenyl)-3-phenyl-5-pyrazolone | Yellow. |
| 14 | Para-anisidine | 1-(3'-sulfophenyl)-3-(4''-chlorophenyl)-5-pyrazolone | Reddish-yellow. |
| 15 | Ortho-chloroaniline | 1-(2'-chloro-5'-sulfophenyl)-3-(4''-methylphenyl)-5-pyrazolone. | Yellow. |
| 16 | Benzidine | 1-(3'-sulfophenyl)-3-(2''-naphthyl)-5-pyrazolone | Red. |

| | Diazotizing component | Coupling component | Tint of the after-chromed dyeing |
|---|---|---|---|
| 17 | 6-nitro-2-aminophenol-4-sulfonic acid | 1-(3'-sulfophenyl)-3-phenyl-5-pyrazolone | Brownish-red. |
| 18 | Ortho-aminophenol | 1-(4'-sulfophenyl)-3-phenyl-5-pyrazolone | Do. |
| 19 | Ortho-aminophenol-4-sulfonic acid | 1-(2'-sulfophenyl)-3-phenyl-5-pyrazolone | Do. |
| 20 | Anthranilic acid | 1-(1'-sulfo-2'-naphthyl)-3-phenyl-5-pyrazolone | Yellow. |
| 21 | 4-chloro-2-amino-phenol | 1-(2'-diphenylsulfone-5'-sulfo-4''-hydroxy-3''-carboxy)-3-phenyl-5-pyrazolone. | Orange. |
| 22 | 4-chloro-2-aminophenol-6-sulfonic acid | 1-(2'-sulfophenyl)-3-phenyl-5-pyrazolone | Red. |
| 23 | 4-nitro-2-aminophenol | 1-(2'-sulfophenyl)-3-(4''-chlorophenyl)-5-pyrazolone | Brownish-red. |
| 24 | 3-nitro-5-amino-2-hydroxy-1-benzoic acid | 1-(4'-sulfophenyl)-3-(4''-methylphenyl)-5-pyrazolone | Do. |
| 25 | Sulfanilic acid | 1-(2'-diphenylsulfone-5'-sulfo-4''-hydroxy-3''-carboxy)-3-(4'''-chlorophenyl)-5-pyrazolone. | Yellow. |
| 26 | 4,6-dinitro-2-amino-phenol | 1-(2'-chloro-5'-sulfophenyl)-3-phenyl-5-pyrazolone | Brown. |
| 27 | 5-amino-2-hydroxy-1-benzoic acid | 1-(2'-hydroxy-3'-carboxy-5'-sulfophenyl)-3-(4''-carboxyphenyl)-5-pyrazolone. | Reddish-yellow. |
| 28 | 4-chloroaniline-2-sulfonic acid | 1-(2'-hydroxy-3'-carboxy-5'-sulfophenyl)-3-(4''-chlorophenyl)-5-pyrazolone. | Yellow. |
| 29 | Para-toluidine | 1-(4'-hydroxy-3'-carboxy-5'-sulfophenyl)-3-phenyl-5-pyrazolone. | Do. |
| 30 | 4-chloro-2-aminophenol | 1-(2'-chloro-5'-sulfophenyl)-3-(4''-chlorophenyl)-5-pyrazolone. | Orange. |
| 31 | 4,4'-diamino-diphenyl-3,3'-dicarboxylic acid | 1-(2'-chloro-4'-sulfophenyl)-3-phenyl-5-pyrazolone | Red. |
| 32 | Aniline | 1 - (2' - hydroxy - 3' - carboxy - 5' - sulfophenyl) - 3 - phenyl - 5-pyrazolone. | Yellow. |
| 33 | 1 - amino - 3 - sulfonyl - (4' - hydroxy - 3' - carboxy-anilido)-benzene. | 1-(2'-chloro-5'-sulfophenyl)-3-phenyl-5-pyrazolone | Do. |
| 34 | 3-chloro-2-aminobenzene-1-carboxylic acid | 1-(4'-sulfophenyl)-3-phenyl-5-pyrazolone | Do. |
| 35 | do | 1 - (2' - chloro - 6' - methyl - 4' - sulfophenyl) - 3 - phenyl - 5-pyrazolone. | Do. |
| 36 | do | 1-(3'-sulfophenyl)-3-(4''-chlorophenyl)-5-pyrazolone | Do. |
| 37 | do | 1-(4'-chloro-2'-sulfophenyl)-3-(β-naphthyl)-5-pyrazolone | Do. |
| 38 | Ortho-aminobenzoic acid | 1-(4'-phenoxy-3'-sulfophenyl)-3-phenyl-5-pyrazolone | Reddish-yellow. |
| 39 | 6-nitro-2-aminophenol-4-sulfonic acid | 1-phenyl-3-(4'-carboxyphenyl)-5-pyrazolone | Bluish-red. |
| 40 | 4-sulfo-2-aminobenzene-1-carboxylic acid | do | Yellow. |
| 41 | 5-nitro-2-aminophenol | 1-(2',4'-dichloro-6'-sulfophenyl)-3-phenyl-5-pyrazolone | Bluish-red. |
| 42 | 6-nitro-4-chloro-2-aminophenol | do | Red. |
| 43 | 4-methyl-6-nitro-2-aminophenol | 1-(2'-sulfophenyl)-3-phenyl-5-pyrazolone | Do. |
| 44 | 5-nitro-2-aminophenol | 1-(2',4'-dimethyl-6'-sulfophenyl)-3-phenyl-5-pyrazolone | Bluish-red. |
| 45 | do | 1-(2'-sulfophenyl)-3-phenyl-5-pyrazolone | Red. |
| 46 | do | 1-(2'-chloro-5'-sulfophenyl)-3-phenyl-5-pyrazolone | Do. |
| 47 | 4-chloro-2-aminophenol-6-sulfonic acid | do | Do. |
| 48 | 5-nitro-2-aminophenol | 1 - (2' - methyl - 4' - chloro - 6' - sulfophenyl) - 3 - phenyl - 5-pyrazolone. | Bluish-red. |

We claim:

1. The azo-dyestuffs of the following general formula:

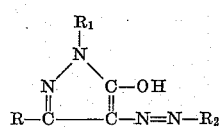

wherein R and R₁ stand for radicals of the benzene or naphthalene series, at least one of which contains at least one substituent of the group consisting of sulfonic acid and carboxylic acid groups, and wherein R₂ represents a radical of the benzene, naphthalene or diphenyl series, dyeing wool from an acid bath yellow to red tints of very good fastness properties.

2. The azo-dyestuff of the following formula:

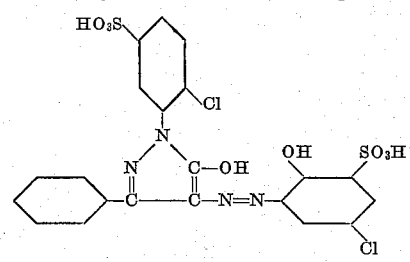

yielding on wool, when after-chromed, a red dyeing of very good fastness properties.

3. The azo-dyestuff of the following formula:

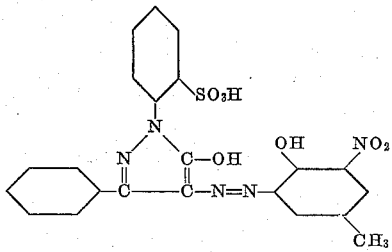

yielding on wool, when after-chromed, a red dyeing of very good fastness properties.

4. The azo-dyestuff of the following formula:

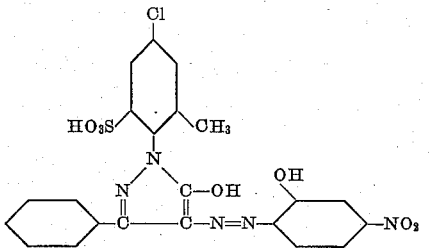

yielding on wool, when after-chromed, a bluish-red dyeing of very good fastness properties.

HERBERT KRACKER.
RICHARD SCHMID.